United States Patent

Janssen et al.

Patent Number: 5,664,922
Date of Patent: Sep. 9, 1997

[54] METAL GUIDE MEMBER WITH GUIDE ARRANGEMENT

[75] Inventors: Rupert Janssen, Meiningen, Austria; Friedrich Groeschel, Buchs, Switzerland

[73] Assignee: Hilti Aktiengesellschaft, Schaan, Liechtenstein

[21] Appl. No.: 311,310

[22] Filed: Sep. 23, 1994

[30] Foreign Application Priority Data

Sep. 23, 1993 [DE] Germany .................. 43 32 355.3

[51] Int. Cl.$^6$ .................. B25C 1/16; F16B 19/14
[52] U.S. Cl. .................. 411/441; 411/440; 411/480; 411/533
[58] Field of Search .................. 411/441, 440, 411/480, 482, 533

[56] References Cited

U.S. PATENT DOCUMENTS

| | | |
|---|---|---|
| 1,675,277 | 6/1928 | Roe .................. 411/533 |
| 2,954,717 | 10/1960 | Henning et al. . |
| 3,038,456 | 6/1962 | Dreisin .................. 411/533 |
| 3,407,982 | 10/1968 | Henning et al. . |
| 3,870,428 | 3/1975 | Jackson .................. 411/441 |
| 4,703,883 | 11/1987 | Losada .................. 411/441 |
| 5,178,503 | 1/1993 | Losada .................. 411/441 |
| 5,292,216 | 3/1994 | Losada .................. 411/441 |
| 5,417,534 | 5/1995 | Losada .................. 411/441 |

FOREIGN PATENT DOCUMENTS

| | | | |
|---|---|---|---|
| 2504816 | 8/1975 | Austria .................. 411/441 |
| 0135427 | 3/1985 | European Pat. Off. . |
| 2260018 | 8/1975 | France . |
| 1113099 | 5/1968 | United Kingdom .................. 411/441 |
| 1146816 | 3/1969 | United Kingdom .................. 411/441 |

Primary Examiner—Rodney M. Lindsey
Assistant Examiner—Fredrick Conley
Attorney, Agent, or Firm—Anderson Kill & Olick P.C.

[57] ABSTRACT

A metal guide member (1) for guiding a fastening member (12) into a hard receiving material, as it is driven by an explosive powder charge driven setting tool, has a through opening (2) with a guide arrangement formed of at least three spaced-apart, plastically deformable guidance surfaces with such surfaces having a convex shape extending in the axial direction of the through opening. The guide arrangement assures guidance of the fastening member as it is driven and, at the same time, avoids any interference with the deformation of the guidance surfaces.

6 Claims, 1 Drawing Sheet

METAL GUIDE MEMBER WITH GUIDE ARRANGEMENT

BACKGROUND OF THE INVENTION

The present invention is directed to a metal guide member for fastening members to be driven into a hard receiving material by an explosive powder charge driven setting tool. The guide member has a through opening with a guide arrangement for guiding the fastening member as it is driven.

Fastening members driven into hard receiving material by explosive powder charge operated setting tools to secure structural components to the surface of generally hard receiving material are known. The fastening members are used for securing plates or wooden strips or the like and the fastening members have a flange-like head or first end and an opposite tapering second end. A guide member is positioned on the tapering end and is displaced during the driving operation along the shank of the fastening member toward the flange-like first end causing a widening of the through opening. The outside dimension of the guide member is greater than the outside diameter of the flange-like head, so that the tensile forces emanating from the fastened components can be transmitted across a large surface to an attachment member.

As it is known, the attachment member is a guide member in the form of a disk seated on the tapering end of the fastening member, and the attachment member has a central through opening with a square cross-section. The greatest diagonal width of the through opening corresponds essentially to the diameter of the shank of the fastening member.

As the fastening member is driven, the disk is displaced from the tapering second end of the fastening member toward the flange-like first end. During the driving operation the central through opening, especially the side of the through opening is widened by the shank of the fastening member, whereby the contact surface between the shank of the fastening member and the inside surface of the through opening increases considerably. As a result, there is the disadvantage that the force required to widen the through opening is very rapidly distributed across a large contact surface, so that further widening of the through opening is practically impossible. A further disadvantage is that an increased friction is generated by the increasing contact surface and acts counter to the driving of the fastening member.

SUMMARY OF THE INVENTION

Therefore, the primary object of the present invention is to provide a guide arrangement for the guide member affording adequate guidance and assuring at the same time that there is no interference with the driving of the fastening member.

In accordance with the present invention, at least three plastically deformable spaced-apart guide surfaces are provided in the circumferential surface of the through opening with the guide surfaces having a convex shape extending in the direction of the central axis of the tool so that the guidance surfaces project into the through opening perpendicularly to the central axis.

Due to the convex shape of the guidance surfaces there is a very slow increase of the contact area between the shank of the fastening member and the guide element with the essentially radial deformation of the guidance surfaces. This concentrates the deforming force over a very small area, whereby the radial deformation of the convex guidance surfaces occurs without encountering any large resistance or interference.

Since there is small contact between the guidance surfaces and the shank of the fastening member, very little friction is generated and the driving operation can proceed without any significant interference.

The guidance surfaces of the guide arrangement are disposed so that in all cases the centered position of the fastening member in the guide member is assured. If the surface of the through opening in the guide member is of considerable axial length, the guide surfaces can be disposed offset at different spaced positions along the central axis and also in the circumferential direction relative to one another.

In case thin guide members are used it is advantageous to arrange the guidance surfaces all in the same plane extending perpendicularly of the central axis of the through opening. Such an arrangement prevents any inclined position of the guidance surfaces with respect to the fastening member.

To gain an additional, easier radial deformation of the guidance surfaces at the start of the driving operation, preferably the guidance surfaces are provided as rounded surfaces. The contact between the guidance surfaces and the shank of the fastening member are then point-shaped. This arrangement facilitates the placement of the disk-like guide member on the tapered end region of the fastening member.

The ratio of the smallest radial dimension between the central axis of the through opening and the guidance surfaces to the largest radial dimension between the central axis of the through aperture and the surface of the aperture between the guidance surfaces is in the range of 1:1.1 to 1:1.8. Guide members having guidance surfaces in the through opening designed in such a relationship assure an effective seating of the guide member on the tapered end of the fastening members and an adequate widening of the through opening during the driving of the fastening member into the receiving material.

Fastening members in combination with retaining or guide members are also used in the placement of electrical wiring. The guide member is secured by the fastening member against the surface of the receiving material while the retaining member serves to support or hold components, such as pipes carrying electrical wiring.

Therefore, the guide member is formed monolithically with the retaining member as a single unit.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
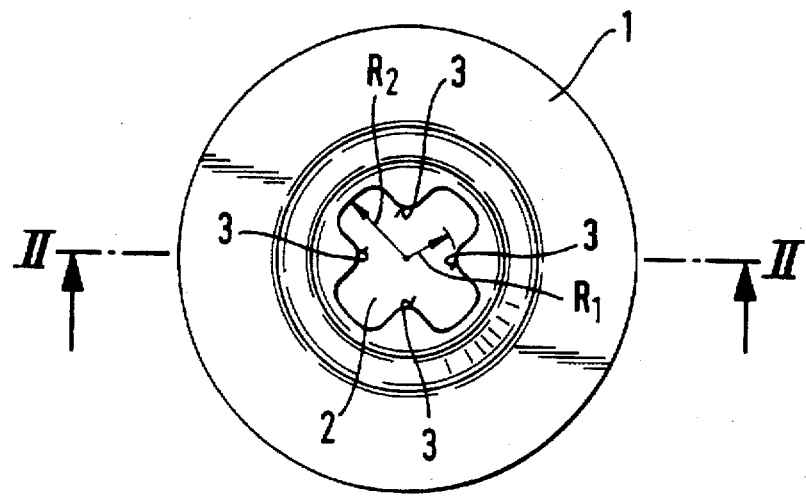
FIG. 1 is an enlarged plan view of a guide member embodying the present invention.
Figure 2:
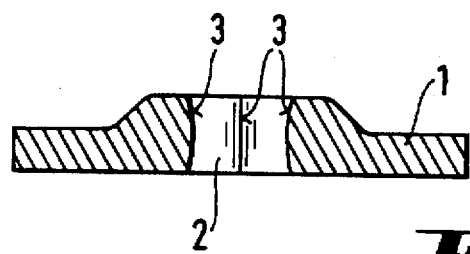
FIG. 2 is a sectional view of the guide member taken along the line II—II in FIG. 1.

In FIGS. 1 and 2 a guide member 1 is shown with a circular outside contour and a central through opening 2.

This is merely one embodiment of the guide member. It may have a variety of shapes and the through opening need not be centered. The through opening 2 has four spaced-apart, plastically deformable guidance surfaces 3. As shown in FIG. 2, the guidance surfaces are convex projecting radially into the through opening so that the least spacing from the central axis is spaced between the opposite ends of the through opening. The radially innermost surfaces of the guidance surfaces are arranged in a single plane extending perpendicularly to the central axis of the through opening 2. With the spaced apart arrangement of the guidance surfaces 3, substantially equally angularly spaced apart as viewed in FIG. 1, there are different radial dimensions R1, R2 between the different surfaces lining the through opening. The smallest radial dimension R1 is the dimension between the central axis of the through opening 2 and the guidance surface 3 centered between the opposite ends of the through opening. The largest radial dimension R2 is located between the central axis of the through opening 2 and the surface of the through opening located between the guide surfaces 3. The ratio between the radial dimension R1 and the radial dimension R2 is in the range of 1:1.1 to 1:1.8.

Figure 3:
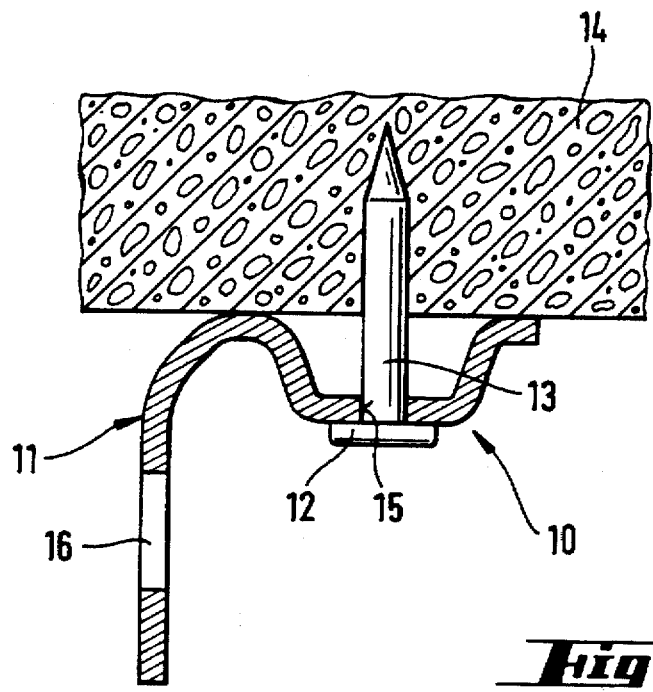
FIG. 3 is a combination retaining member and guide member shown enlarged with the two members formed as a single unit.

In FIG. 3 another embodiment of the invention is illustrated composed of a guide member 10 formed integrally with a retaining member 11 forming a single unit and the unit is fixed to the surface of a receiving material 14 by a nail-like fastening member 12. Note in FIG. 3 that the fastening element 12 has a flange-like end or head bearing against the guide member and a shank 13 extending from the head into the receiving material and terminating in a tapered end. Guide member 10 has a through opening 15 through which the fastening member 12 extends. Though not shown, the through opening 15 has at least three circumferentially spaced-apart, plastically deformable guidance surfaces with a convex shape and which project into the through opening 15. The smallest radial dimension of the through opening 15, formed by the guidance surfaces, is smaller than the outside of the shank 13 of the fastening member 12. The largest radial dimension of the through opening 15 is arranged at least equal to the outside diameter of the shank 13 of the fastening member 12. The guide member 10 is formed as a single member with the retaining member 11 and the combination is strip-shaped. The retaining member 11 has an opening for receiving components. Accordingly, a pipe clamp, not shown, can be attached to the retaining member and the clamp can be used to support a pipe line, such as a pipe line for electrical wiring.

In FIG. 3, the receiving material 14 into which the fastening member 12 is driven by an explosive powder charge operated setting tool, not shown, is concrete.

While specific embodiments of the invention have been shown and described in detail to illustrate the inventive principles, it will be understood that the invention may be embodied otherwise without departing from such principles.

We claim:

1. Metal guide member (1, 10) for guiding a fastening member (12) to be driven into a hard receiving material (14) by an explosive powder charge driven setting tool, said guide member have a through opening (2, 15) with a central axis and said opening having a guide arrangement (3) for guiding the fastening member (12) as it is driven into the receiving material, wherein the improvement comprises that said through opening having an axial length, said guide member includes at least three circumferentially spaced-apart plastically deformable guidance surfaces (3) with said guidance surfaces being convex and curved in the direction of the central axis and projecting inwardly toward and perpendicularly to the central axis, and said guidance surfaces (3) having an axial length substantially equal to the axial length of said through opening.

2. Metal guide member, as set forth in claim 1, wherein said guidance surfaces each having a radially innermost surface located in a common plane extending perpendicularly to the central axis of the through opening (2, 15) and spaced axially between opposite ends of said through opening.

3. Metal guide member, as set forth in claim 1 or 2, wherein said guidance surfaces have a rounded shape, extending perpendicular to the direction of the central axis.

4. Metal guide member, as set forth in claim 2, wherein said through opening has a circumferentially arranged surface extending in the direction of the central axis of the through opening and including said guidance surfaces, each said radially innermost surface of said guidance surfaces having a smallest radial dimension from the central axis and said circumferentially arranged surface having a largest radial dimension spaced circumferentially between adjacent said guidance surfaces and the ratio between the smallest radial dimension and the largest radial dimension is in the range of 1:1.1 to 1:1.8.

5. Metal guide member, as set forth in claim 1 or 2, wherein the guide member (10) is connected to a retaining member (11) and said guide member and retaining member form a single unit.

6. Metal guide member, as set forth in claim 5, wherein said retaining member (11) extends generally perpendicularly to said guide member and includes means for supporting a component to be secured on the hard receiving material.

* * * * *